United States Patent
Yu et al.

(10) Patent No.: US 12,153,917 B2
(45) Date of Patent: *Nov. 26, 2024

(54) SYSTEMS AND METHODS FOR REDUCING SERVICE DOWNTIME DURING SOFTWARE UPGRADES

(71) Applicant: DISH Wireless L.L.C., Englewood, CO (US)

(72) Inventors: Frank Tao Yu, Broadlands, VA (US); Farhad Bassirat, Arlington, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,803

(22) Filed: Oct. 25, 2023

(65) Prior Publication Data

US 2024/0069902 A1 Feb. 29, 2024

Related U.S. Application Data

(63) Continuation of application No. 17/705,064, filed on Mar. 25, 2022, now Pat. No. 11,836,480.

(51) Int. Cl.
*G06F 8/65* (2018.01)
*G06F 8/61* (2018.01)
(Continued)

(52) U.S. Cl.
CPC .................. *G06F 8/65* (2013.01); *G06F 8/61* (2013.01); *H04L 67/01* (2022.05); *H04L 67/52* (2022.05); *H04L 67/56* (2022.05)

(58) Field of Classification Search
CPC ........................................................ G06F 8/65
See application file for complete search history.

(56) References Cited

U.S. PATENT DOCUMENTS 11,836,480 B2 12/2023 Yu et al.
2015/0195723 A1 7/2015 Park
(Continued)

FOREIGN PATENT DOCUMENTS

KR 10-2019-0091866 A 8/2019

OTHER PUBLICATIONS

Fujitsu: "Discussion on IP-based tunnel between IAB-donor-Dus", 3GPP Draft; R3-214870, 3rd Generation Partnership Project (3GPP), Mobile Competence Centre, vol. RAN WG3, No. electronic, Oct. 22, 2021.
(Continued)

*Primary Examiner* — Jae U Jeon
(74) *Attorney, Agent, or Firm* — Jeremiah J. Baunach; Frontier IP Law PLLC

(57) ABSTRACT

A method for performing a software update that reduces down time in a Radio Access Network (RAN) is disclosed. A first computing device receives first Distributed Unit (DU) configuration information including an address of a first radio unit (RU) device. The first computing device cause the first RU device to stores an address of the first computing device as a value of a configuration parameter. After a second computing device installs software, the second computing device receives the first DU configuration information including the address of the first RU device. The first computing device receives an instruction to stop data transmission to the first RU device. The second computing device causes the first RU device stores an address of the second computing device as the value of the configuration parameter. The second computing device receives an instruction to start data transmission to the first RU device.

20 Claims, 10 Drawing Sheets

(51) Int. Cl.
  *H04L 67/01* (2022.01)
  *H04L 67/52* (2022.01)
  *H04L 67/56* (2022.01)

(56) References Cited

U.S. PATENT DOCUMENTS

| | | | |
|---|---|---|---|
| 2016/0013550 A1* | 1/2016 | Artemenko | H01Q 3/245 |
| | | | 370/280 |
| 2017/0331577 A1 | 11/2017 | Parkvall et al. | |
| 2017/0331670 A1 | 11/2017 | Parkvall et al. | |
| 2018/0242355 A1 | 8/2018 | Lou et al. | |
| 2019/0124577 A1 | 4/2019 | Li et al. | |
| 2019/0150220 A1* | 5/2019 | Byun | H04W 76/11 |
| | | | 370/329 |
| 2019/0245740 A1* | 8/2019 | Kachhla | H04L 41/04 |
| 2020/0204252 A1 | 6/2020 | Barbieri et al. | |
| 2020/0351786 A1 | 11/2020 | Koskela et al. | |
| 2021/0029025 A1 | 1/2021 | Abedini et al. | |
| 2021/0176658 A1* | 6/2021 | Wang | H04W 76/12 |
| 2021/0266764 A1* | 8/2021 | Khanfouci | H04M 15/8016 |
| 2021/0352132 A1 | 11/2021 | Nix | |
| 2022/0014326 A1 | 1/2022 | Lourdu et al. | |
| 2022/0167449 A1 | 5/2022 | Wang et al. | |
| 2022/0272594 A1 | 8/2022 | Anderson et al. | |
| 2022/0286910 A1 | 9/2022 | Ramakrishnan et al. | |
| 2022/0295444 A1 | 9/2022 | Wu et al. | |
| 2022/0353775 A1 | 11/2022 | Wager et al. | |
| 2023/0050355 A1 | 2/2023 | Laselva et al. | |
| 2023/0088205 A1 | 3/2023 | Lourdu et al. | |
| 2023/0156591 A1 | 5/2023 | Abedini et al. | |
| 2023/0305831 A1 | 9/2023 | Yu et al. | |
| 2023/0308902 A1 | 9/2023 | Yu et al. | |

OTHER PUBLICATIONS

Anonymous: "O-RAN Alliance Working Group 4; Management Plane Specification v05.00 O-RAN.WG4.MP.0-v05.00", Feb. 28, 2021, pp. 1-102.
LG UPlus: "Consideration of Digital Unit redundancy in LTE based railway systems", 3GPP Draft; S6-191318, vol. SA WG6, No. Roma, Jul. 1, 2019.
International Search Report and Written Opinion received for PCT Patent Application No. PCT/US2023/013256, mailed on May 26, 2023 14 pages.
International Search Report and Written Opinion received for PCT Patent Application No. PCT/US2023/013255, mailed on Jun. 9, 2023, 11 pages.
Jordan Eugina: "Open RAN functional splits, explained", Retrieved from https://www.5gtechnologyworld.com/open-ran-functional-splits-explained, Feb. 24, 2021.

* cited by examiner

| 302-11 | ← MIRROR |
|---|---|
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← DU#3 |
| 302-2 | ← DU#2 |
| 302-1 | ← DU#1 |

*FIG. 8A*

| 302-11 | ← DU#1-Upgraded |
|---|---|
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← DU#3 |
| 302-2 | ← DU#2 |
| 302-1 | ← MIRROR |

*FIG. 8B*

| 302-11 | ← DU#1-Upgraded |
|---|---|
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← DU#3 |
| 302-2 | ← MIRROR |
| 302-1 | ← DU#2-Upgraded |

*FIG. 8C*

| 302-11 | ← DU#1-Upgraded |
|---|---|
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← MIRROR |
| 302-2 | ← DU#3-Upgraded |
| 302-1 | ← DU#2-Upgraded |

*FIG. 8D*

| 302-11 | ← DU#1-Upgraded |
| --- | --- |
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← MIRROR |
| 302-3 | ← DU#4-Upgraded |
| 302-2 | ← DU#3-Upgraded |
| 302-1 | ← DU#2-Upgraded |

FIG. 8E

| 302-11 | ← DU#1-Upgraded |
| --- | --- |
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← MIRROR |
| 302-4 | ← DU#5-Upgraded |
| 302-3 | ← DU#4-Upgraded |
| 302-2 | ← DU#3-Upgraded |
| 302-1 | ← DU#2-Upgraded |

FIG. 8F

| 302-11 | ← DU#1-Upgraded |
| --- | --- |
| 302-10 | ← DU#10 |
| 302-9 | ← DU#9 |
| 302-8 | ← DU#8 |
| 302-7 | ← DU#7 |
| 302-6 | ← MIRROR |
| 302-5 | ← DU#6-Upgraded |
| 302-4 | ← DU#5-Upgraded |
| 302-3 | ← DU#4-Upgraded |
| 302-2 | ← DU#3-Upgraded |
| 302-1 | ← DU#2-Upgraded |

FIG. 8G

| 302-11 | ← DU#1-Upgraded |
| --- | --- |
| 302-10 | ← DU#10 |
| 302-9 | ← DU#9 |
| 302-8 | ← DU#8 |
| 302-7 | ← MIRROR |
| 302-6 | ← DU#7-Upgraded |
| 302-5 | ← DU#6-Upgraded |
| 302-4 | ← DU#5-Upgraded |
| 302-3 | ← DU#4-Upgraded |
| 302-2 | ← DU#3-Upgraded |
| 302-1 | ← DU#2-Upgraded |

FIG. 8H

| | |
|---|---|
| 302-11 | ← DU#1-Upgraded |
| 302-10 | ← DU#10 |
| 302-9 | ← DU#9 |
| 302-8 | ← MIRROR |
| 302-7 | ← DU#8-Upgraded |
| 302-6 | ← DU#7-Upgraded |
| 302-5 | ← DU#6-Upgraded |
| 302-4 | ← DU#5-Upgraded |
| 302-3 | ← DU#4-Upgraded |
| 302-2 | ← DU#3-Upgraded |
| 302-1 | ← DU#2-Upgraded |

*FIG. 8I*

| | |
|---|---|
| 302-11 | ← DU#1-Upgraded |
| 302-10 | ← DU#10 |
| 302-9 | ← MIRROR |
| 302-8 | ← DU#9-Upgraded |
| 302-7 | ← DU#8-Upgraded |
| 302-6 | ← DU#7-Upgraded |
| 302-5 | ← DU#6-Upgraded |
| 302-4 | ← DU#5-Upgraded |
| 302-3 | ← DU#4-Upgraded |
| 302-2 | ← DU#3-Upgraded |
| 302-1 | ← DU#2-Upgraded |

*FIG. 8J*

| | |
|---|---|
| 302-11 | ← DU#1-Upgraded |
| 302-10 | ← MIRROR |
| 302-9 | ← DU#10-Upgraded |
| 302-8 | ← DU#9-Upgraded |
| 302-7 | ← DU#8-Upgraded |
| 302-6 | ← DU#7-Upgraded |
| 302-5 | ← DU#6-Upgraded |
| 302-4 | ← DU#5-Upgraded |
| 302-3 | ← DU#4-Upgraded |
| 302-2 | ← DU#3-Upgraded |
| 302-1 | ← DU#2-Upgraded |

*FIG. 8K*

SYSTEMS AND METHODS FOR REDUCING SERVICE DOWNTIME DURING SOFTWARE UPGRADES

BACKGROUND

Technical Field

The present disclosure relates generally to wireless cellular telecommunications, more particularly, to software upgrades in Distributed Unit (DU) devices of such telecommunication networks.

BRIEF SUMMARY

5G Networks typically include a Core Network (Core) that coordinate operations of a Radio Access Network (RAN), which provides network services to end user devices such as smartphones and sensors. The Core Network (Core) may be implemented in a cloud computing environment by virtual servers that communicate with computing devices located at a local data center (LDC) that are configured as Distributed Unit (DU) devices, each of which provides network services to a group of associated Radio Unit (RU) devices located at a cell site. When a computing device that functions as a DU device is processing a software upgrade, the computing device is not able to perform the functions of the DU device that provide network services to the associated RU device. Such processing typically lasts for over five minutes. Accordingly, end user devices in a vicinity of the cell site where the associated RU devices are located, which rely on the DU device and the associated RU devices to provide network services, experience service interruptions that typically lasts for over five minutes.

In order to solve such a technical problem, when a software upgrade is to be performed on a first computing device that functions as a DU, the software upgrade is performed on a second computing device that is capable of performing the functions of the DU, and then a configuration of the DU is copied or dynamically mirrored to the second computing device. The second computing device then begins operating as the DU that provides network services to the associated RU. Accordingly, network service downtime is significantly reduced compared to conventional software upgrade techniques.

A method performed in a Radio Access Network (RAN), which includes a first Radio Unit (RU) device, a first computing device, and a second computing device different from the first computing device, according to the present disclosure may be summarized as including: receiving, by the first computing device, first Distributed Unit (DU) configuration information that includes an address of the first RU device; storing, by the first RU device, an address of the first computing device as a value of a configuration parameter; installing, by the second computing device, software on the second computing device; receiving, by the second computing device, the first DU configuration information that includes the address of the first RU device; receiving, by the first computing device, an instruction to stop data transmission to the first RU device; storing, by the first RU device, an address of the second computing device as the value of the configuration parameter; and receiving, by the second computing device, an instruction to start data transmission to the first RU device.

The receiving, by the first computing device, the instruction to stop data transmission to the first RU device may be before the storing, by the first RU device, the address of the second computing device as the value of the configuration parameter.

The method may further include establishing, by the second computing device, a Network Configuration (NETCONF) protocol session with the first RU device, and requesting, by the second computing device, the first RU device to store the address of the second computing device as the value of the configuration parameter during the NETCONF protocol session with the first RU device.

The RAN may include a second RU device different from the first RU device, the first DU configuration information may include an address of the second RU device, and the method may further include storing, by the second RU device, the address of the first computing device as the value of the configuration parameter; receiving, by the first computing device, an instruction to stop data transmission to the second RU device; storing, by the second RU device, the address of the second computing device as the value of the configuration parameter; and receiving, by the second computing device, an instruction to start data transmission to the second RU device.

The method may further include installing, by the first computing device, the software on the first computing device.

The RAN may include a second RU device different from the first RU device and a third computing device different from the first computing device and the second computing device, and the method further may include: installing, by the first computing device, the software on the first computing device; receiving, by the third computing device, second DU configuration information that may include an address of the second RU device; storing, by the second RU device, an address of the third computing device as the value of the configuration parameter; receiving, by the first computing device, the second DU configuration information that may include the address of the second RU device; receiving, by the third computing device, an instruction to stop data transmission to the second RU device; storing, by the second RU device, the address of the first computing device as the value of the configuration parameter; and receiving, by the first computing device, an instruction to start data transmission to the second RU device.

A method of performing a software update by a network management system for a Radio Access Network (RAN), which includes a first Radio Unit (RU) device, a first computing device, and a second computing device different from the first computing device, according to the present disclosure may be summarized as including: transmitting first Distributed Unit (DU) configuration information including an address of the first RU device to the first computing device; causing the first RU device to store an address of the first computing device as a value of a configuration parameter; causing the second computing device to install software; transmitting the first DU configuration information including the address of first RU device to the second computing device; causing the first computing device to stop data transmission to the first RU device; causing the first RU device to store an address of the second computing device as the value of the configuration parameter; and causing the second computing device to start data transmission to the first RU device.

The method may further include causing the first computing device to install the software.

The RAN may include a second RU device different from the first RU device, the RAN may include a third computing device different from the first computing device and the second computing device, and the method further may include: transmitting second DU configuration information including an address of the second RU device to the third computing device; causing the second RU device to store an address of the third computing device as the value of the configuration parameter; causing the first computing device to install the software; transmitting the second DU configuration information including the address of second RU device to the first computing device; causing the third computing device to stop data transmission to the second RU device; causing the second RU device to store the address of the first computing device as the value of the configuration parameter; and causing the first computing device to start data transmission to the second RU device.

The RAN may include a second RU device different from the first RU device, the first DU configuration information may include an address of the second RU device, and the method further may include: causing the second RU device to store address of the first computing device as the value of the configuration parameter; causing the first computing device to stop data transmission to the second RU device; causing the first RU device to store the address of the second computing device as the value of the configuration parameter; and causing the second computing device to start data transmission to the second RU device.

The causing the first computing device to stop data transmission to the first RU device may be before the causing the first RU device to store the address of the second computing device as the value of the configuration parameter.

The causing the first RU device to store the address of the first computing device as the value of the configuration parameter may include causing the first computing device to establish a Network Configuration (NETCONF) protocol session with the first RU device, and the causing the first RU device to store the address of the second computing device as the value of the configuration parameter may include causing the second computing device to establish a NETCONF protocol session with the first RU device.

The causing the second computing device to install software may include: causing the second computing device to store the software; causing the second computing device to perform an installation process that installs the software on the second computing device; and causing the second computing device or at least one process running on the second computing device to restart after the software may be installed on the second computing device.

A network management system for a Radio Access Network (RAN), which includes a first Radio Unit (RU) device, a first computing device, and a second computing device different from the first computing device, according to the present disclosure may be summarized as including: one or more processors; and one or more storage devices storing instructions that, when executed by the one or more processors, cause the one or more processors to: transmit first Distributed Unit (DU) configuration information including an address of the first RU device to the first computing device; cause the first RU device to store an address of the first computing device as a value of a configuration parameter; cause the second computing device to install software; transmit the first DU configuration information including the address of first RU device to the second computing device; cause the first computing device to stop data transmission to the first RU device; cause the first RU device to store an address of the second computing device as the value of the configuration parameter; and cause the second computing device to start data transmission to the first RU device.

The instructions stored by the one or more storage devices, when executed by the one or more processors, may cause the one or more processors to cause the first computing device to install the software.

The RAN may include a second RU device different from the first RU device, the RAN may include a third computing device different from the first computing device and the second computing device, and the instructions stored by the one or more storage devices, when executed by the one or more processors, cause the one or more processors to: transmit second DU configuration information including an address of the second RU device to the third computing device; cause the second RU device to store an address of the third computing device as the value of the configuration parameter; cause the first computing device to install the software; transmit the second DU configuration information including the address of second RU device to the first computing device; cause the third computing device to stop data transmission to the second RU device; cause the second RU device to store the address of the first computing device as the value of the configuration parameter; and cause the first computing device to start data transmission to the second RU device.

The RAN may include a second RU device different from the first RU device, the first DU configuration information may include an address of the second RU device, and the instructions stored by the one or more storage devices, when executed by the one or more processors, cause the one or more processors to: cause the second RU device to store address of the first computing device as the value of the configuration parameter; cause the first computing device to stop data transmission to the second RU device; cause the first RU device to store the address of the second computing device as the value of the configuration parameter; and cause the second computing device to start data transmission to the second RU device.

The instructions stored by the one or more storage devices, when executed by the one or more processors, may cause the one or more processors to cause the first computing device to stop data transmission to the first RU device may be before causing the first RU device to store the address of the second computing device as the value of the configuration parameter.

The instructions stored by the one or more storage devices, when executed by the one or more processors, may cause the one or more processors to: cause the first computing device to establish a Network Configuration (NETCONF) protocol session with the first RU device to cause the first RU device to store the address of the first computing device as the value of the configuration parameter may include, and cause the second computing device to establish a NETCONF protocol session with the first RU device to cause the first RU device to store the address of the second computing device as the value of the configuration parameter may include.

The instructions stored by the one or more storage devices, when executed by the one or more processors, may cause the one or more processors to; cause the second computing device to store the software; cause the second computing device to perform an installation process that installs the software on the second computing device; and cause the second computing device or at least one process running on the second computing device to restart after the software may be installed on the second computing device.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings:

FIGS. 8A to 8K are diagrams for explaining an example of performing a software upgrade on a plurality of computing devices that can be configured to operate as Distributed Unit (DU) devices in accordance with embodiments described herein.

DETAILED DESCRIPTION

Figure 1:
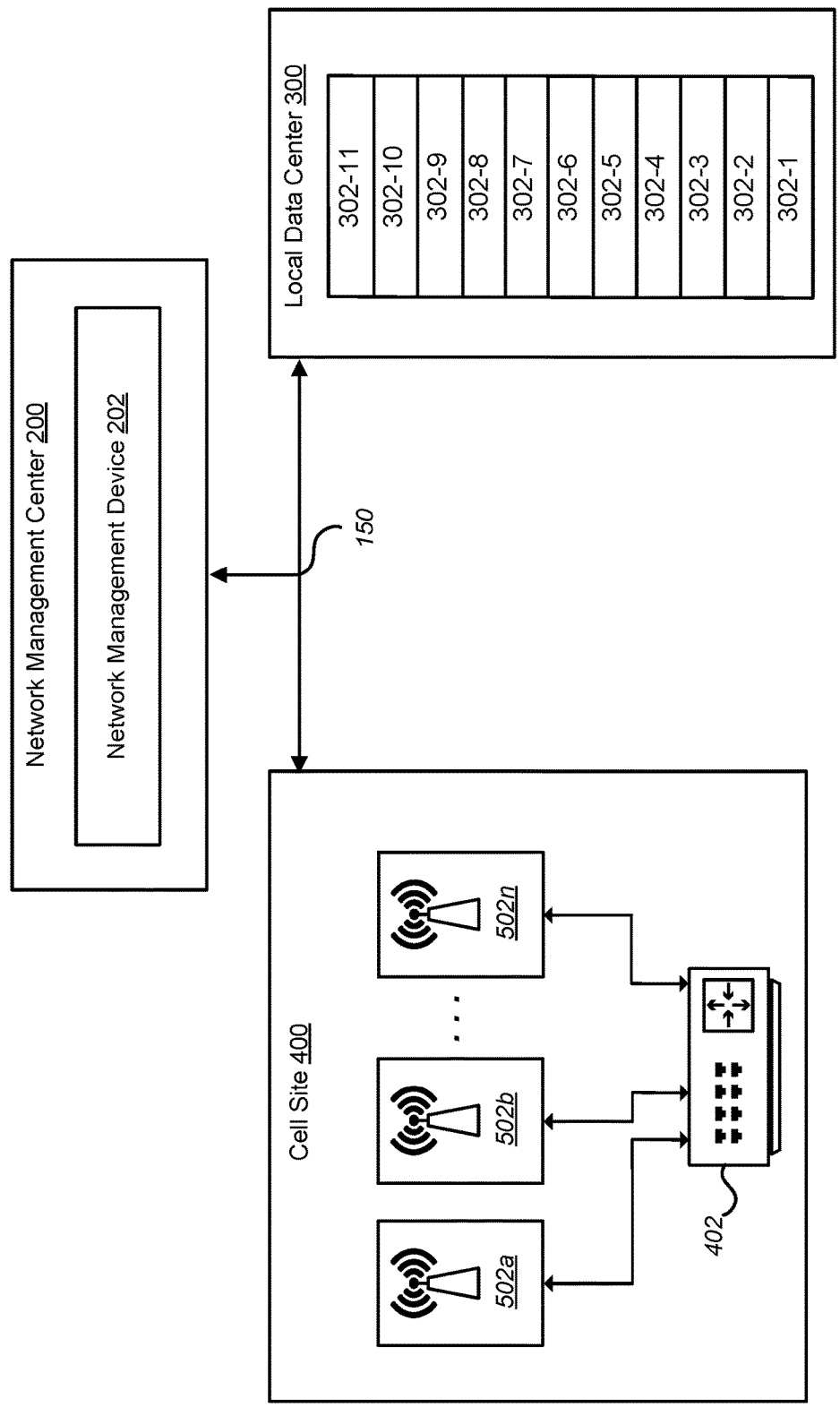
FIG. 1 is a block diagram illustrating a system including a network management device, a plurality of computing devices that can be configured to operate as Distributed Unit (DU) devices, a Cellular Site Router (CSR) device, and a plurality of Radio Unit (RU) devices in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The present disclosure teaches systems and methods for reducing service downtime when processing O-DU device software upgrades which normally cause over five minutes service interruption. By having one or more redundant DU devices at a LDC, service interruptions can be minimized when software upgrades are performed on DU devices that were previously providing services to associated RU devices. Such systems and methods cannot be realized in a traditional Remote Radio Unit (RRU) device and Baseband Unit (BBU) device structure, because to connections between RRU and BBU devices is implemented in static Common Public Radio Interface (CPRI).

The Open Radio Access Network (O-RAN) ALLIANCE has an O-RAN Fronthaul Working Group that has published a Control, User and Synchronization Plane Specification (e.g., O-RAN.WG4.CUS.0-v07.00). Section 3.4 of the specification recites, in part, "In addition, O-RU data flows can be switched/routed to different O-DUs (or different O-DU ports or O-DU processors) according to the transport-based identifiers associated with an eAxCid (referred to as processing-elements in the WG4 M-Plane Specification) to allow frames/packets to be switched/routed by network equipment with no visibility of the eAxC values carried in the eCPRI/1914.3 header." However, the specification does not disclose a system level design to implement switching/routing of O-RU data flows to different O-DUs. Moreover, the specification does not disclose use of redundant O-DU devices to perform software upgrades. Accordingly, network services provided by an O-DU device that is undergoing a software upgrade are not available until the software upgrade is completed. The present disclosure teaches deploying one or more dynamic mirror O-DU devices at a LDC that can be rapidly configured to provide services to Radio Unit (RU) devices previously associated with an O-DU device that is undergoing a software upgrade. In a typical cloud-based wireless network structure, a LDC accommodates a certain number of O-DU devices to serve O-RU devices at cell sites that are within in a 20 to 40 kilometer radius of the LDC. The present disclosure teaches systems and methods for reducing service interruptions when a software upgrade is performed on an O-DU device, which can provide better end user experiences.

According to the present disclosure, a total number of DU devices deployed in an LDC may be n+1, where n DU devices are required to provide services to RU devices that are supported by the LDC, and 1 is the number of dynamic mirror DU devices. In some implementations, x is the number of dynamic mirror DU devices included in an LDC, where x is greater than one.

A Network Management System (NMS) includes at least one network management device that performs Element Management System (EMS) functions, Service Management and Orchestration (SMO) functions, and Service Orchestrator (SO) functions that enable it to keep an inventory of DU devices in each LDC. Thus, the network management device performing the EMS/SMO/SO functions is aware that one or more dynamic mirror DU devices are available at the LDC. Each dynamic mirror DU device is instantiated in the LDC, and F1, E2, and O1 interfaces of the backup DU device are established so that the dynamic mirror DU device can quickly start providing services when needed. Because each dynamic mirror DU device does not have any RU devices connected to it, the network management device performing the EMS/SMO/SO functions can set the DU device in a power saving mode, for example, using a cloud platform such as VMWare. In one or more implementations, the network management device performing the EMS/SMO/SO functions performs Connection Management (CM), lifecycle management (LCM), and Cloud-Native Functions (CNFs) related to inventory and resource management.

For example, assume that a total number xx DU devices are deployed in an LDC. The network management device performing the EMS/SMO/SO functions keeps DU device inventory data for each LDC. Hence, the network management device performing the EMS/SMO/SO functions can create a queue of DU devices, and then schedule software upgrades for each DU device in the queue. Prior to performing the software upgrades, the network management device performing the EMS/SMO/SO functions causes each dynamic mirror DU device in an LDC to be instantiated with F1, E2, and O1 interfaces established. Because each dynamic mirror DU device does not have any RU devices connected to it, the network management device performing the EMS/SMO/SO functions can set the dynamic mirror DU devices in a power saving mode, for example, using a cloud platform such as VMWare. When new DU device software is released and ready to deploy, the network management device performing the EMS/SMO/SO functions causes the dynamic mirror DU devices to wakeup and to be upgraded with the new DU device software. Because each dynamic mirror DU device does not have any RU devices connected to it, each dynamic mirror DU device does not perform C/U/M-Plane control for any RU devices. Thus, the network management device performing the EMS/SMO/SO functions can verify the upgraded software at each dynamic mirror DU device, and there is no service impact to any RU devices.

When a DU device in a software upgrade queue is ready to be upgraded, the network management device performing the EMS/SMO/SO functions causes configuration information of the DU device with software that is to be upgraded to be copied or cloned to a dynamic mirror DU device that has already had its software upgraded. Also, the network management device performing the EMS/SMO/SO functions causes the dynamic mirror DU device, which has been configured with the configuration information of the DU device with software that is to be upgraded, to initiate Network Configuration (NETCONF) protocol sessions to all the RU devices controlled by the DU device with software that is to be upgraded using the configuration of the DU device with software that is to be upgraded, which includes information regarding those RU devices including their IP addresses. When the NETCONF protocol sessions have been completed, the dynamic mirror DU may send a message indicating that the NETCONF protocol sessions have been completed. In response, the network management device performing the EMS/SMO/SO functions may instruct the DU device with software that is to be upgraded to stop transfer C/U-Plane data to those RU device.

For example, there may be six RU devices controlled by the DU device with software that is to be upgraded. The network management device performing the EMS/SMO/SO functions may instruct the DU device with software that is to be upgraded to stop transmitting C/U-Plane data to a first RU device, and instruct the dynamic mirror DU to initiate U-Plane configuration to the first RU device, and to start sending data to and receiving data from the first RU device. The network management device performing the EMS/SMO/SO functions may sequentially repeat the above procedure for each of the other RU devices until the dynamic mirror DU takes over control of all of the RU devices from the DU device with software that is to be upgraded. The network management device performing the EMS/SMO/SO functions may then cause the DU device with software that is to be upgraded to undergo a software update procedure. After that DU device has undergone the software update procedure, the DU device is available to be used as a dynamic mirror DU for another DU device with software that is to be upgraded. This process can be repeated until all DU devices in the LDC have undergone the software update procedure.

FIG. 1 is a block diagram illustrating a network system 100 in accordance with embodiments described herein. A network management center 200 includes a network management system or device 202 which can monitor the operational status, configure software on, and remotely execute programs on various devices in the network system 100. In one or more implementations, the network management device 202 is part of a Core Network (Core) and is implemented in a cloud computing environment by one or more virtual servers.

A local data center (LDC) 300 includes a plurality of computing devices 302-1 to 302-11 that can be configured to operate as Distributed Unit (DU) devices. In one or more implementations, the functionality of the Distributed Unit (DU) devices is defined in technical specifications provided by the Open Radio Access Network (O-RAN) Alliance. Although the local data center (LDC) 300 shown in FIG. 1 includes eleven computing devices, the local data center (LDC) 300 may include a greater number or a smaller number of computing devices without departing from the scope of the present disclosure.

A cell site 400 includes a Cellular Site Router (CSR) device 402 that is coupled to a plurality of Radio Unit (RU) devices 502a to 502n using a plurality of cabled connections. In one or more implementations, the Cellular Site Router (CSR) device 402 is coupled to six Radio Unit (RU) devices. The Cellular Site Router (CSR) device 402 and the Radio Unit (RU) devices 502a to 502n communicate with the computing devices 302-1 to 302-11 and the network management device 202 using a fronthaul interface network 150. In one or more implementations, the functionality of the Cellular Site Router (CSR) device 402 and the Radio Unit (RU) devices 502a to 502n is defined in technical specifications provided by the Open Radio Access Network (O-RAN) Alliance. For illustrative simplicity, only one cell site is shown in FIG. 1; however, the fronthaul interface network 150 may connect the computing devices 302-1 to 302-11 in the local data center (LDC) 300 with a plurality of cell sites, for example, within a radius of 20 kilometers of the local data center (LDC) 300.

The Cellular Site Router (CSR) device 402 and the Radio Unit (RU) devices 502a to 502n are part of a Radio Access Network (RAN). The Radio Access Network (RAN) is the final link between the network system 100 and end user devices such as mobile phones or other connected device. It includes the antennae seen on cellular telecommunications towers, on top of buildings or in stadia, plus the base stations. When a cellular telephone call is made or a connection to a remote server is made, the antenna transmits and receives signals to and from the cellular telephone phones or other connected devices, e.g., Internet-of-Things (IoT)

devices. The signal is then digitalized in the RAN base station and connected into the network.

The Core Network (Core) has many functions. It provides access controls ensuring users are authenticated for the services they are using, it routes telephone calls over the public-switched telephone network, it enables operators to charge for calls and data use, and it connects users to the rest of the world via the Internet. It also controls the network by making handovers happen as a user moves from coverage provided by one RAN tower to the next.

In an Open RAN environment, the Radio Access Network (RAN) is disaggregated into three main building blocks: Radio Unit (RU) devices, Distributed Unit (DU) devices, and Centralized Unit (CU) devices. Each Radio Unit (RU) device, such as Radio Unit (RU) devices 502a to 502n of FIG. 1, is located at a cellular telecommunications tower base station where the radio frequency signals are transmitted, received, amplified and digitized. Each Radio Unit (RU) is located near, or integrated into, the antennas of the cellular telecommunications tower. Each cellular telecommunications tower may have multiple (e.g., 3 or 6) Radio Unit (RU) devices to fully service a particular coverage area.

Each Distributed Unit (DU) is configured to perform computations and provide network services to a group of Radio Unit (RU) devices and the Centralized Unit (CU). For example, the computing device 302-1 may be configured to operate as a first Distributed Unit (DU) DU #1 that receives the digitialized radio signal from the Radio Unit (RU) devices 502a to 502n via the Cellular Site Router (CSR) device 402 that routes traffic from the Radio Unit (RU) devices 502a to 502n to the Distributed Unit (DU) DU #1, and send the digitialized radio signal into the network system 100. The computing devices configured to operate as Distributed Unit (DU) devices are physically located at the local data center (LDC) 300, which is located near the RUs. The Centralized Unit (CU) can be located nearer the Core Network (Core).

One key concept of Open RAN is "open" protocols and interfaces between these various building blocks (i.e., Radio Unit (RU) devices, Distributed Unit (DU) devices, and Centralized Unit (CU) devices). Another key concept of Open RAN is using commercial off-the-shelf (COTS) equipment for each of the devices in the network. The O-RAN Alliance has defined at least 11 different interfaces within the Radio Access Network (RAN) including those for: Fronthaul between the Radio Unit (RU) devices and the associated Distributed Unit (DU), Midhaul between the Distributed Unit (DU) and the Centralized Unit (CU), and Backhaul connecting the Radio Access Network (RAN) to the Core Network (Core).

Figure 2:
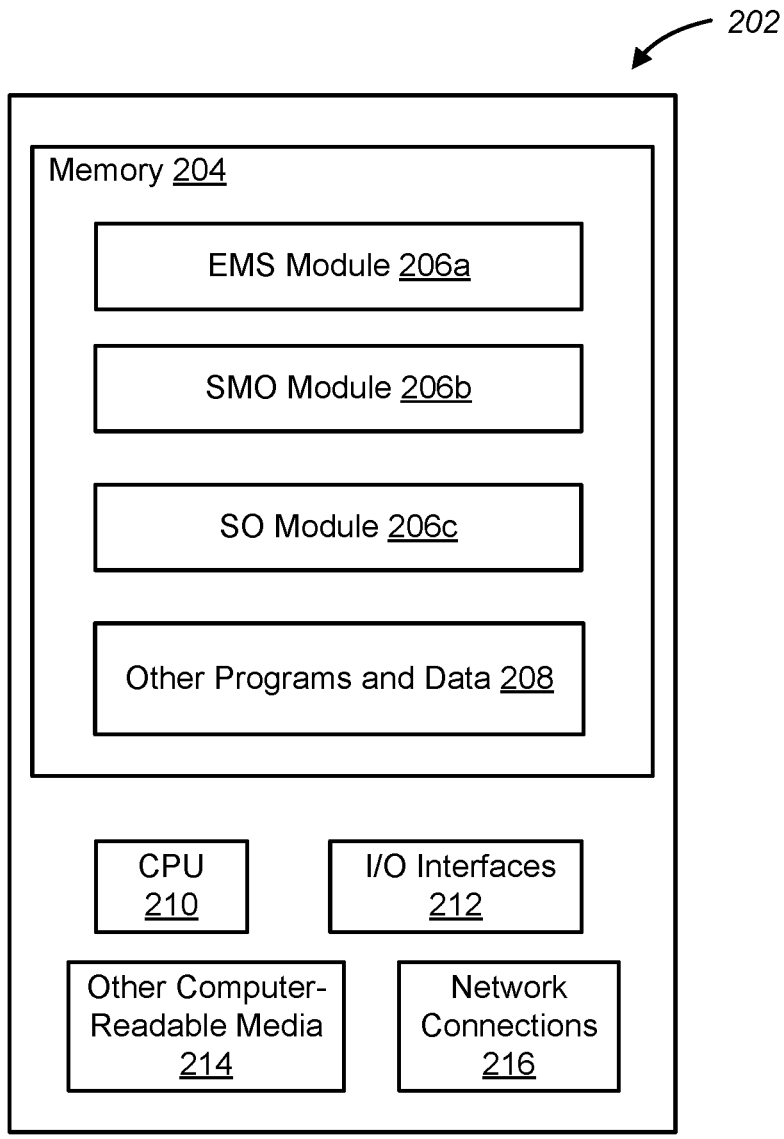
FIG. 2 is a block diagram illustrating a computing device that is configured to operate as a network management device in accordance with embodiments described herein.

FIG. 2 is a block diagram illustrating a computing device that is configured to operate as a network management device 202 in accordance with embodiments described herein. In some embodiments, one or more special-purpose computing systems may be used to implement the Network management device 202. Accordingly, various embodiments described herein may be implemented in software, hardware, firmware, or in some combination thereof. The Network management device 202 may include one or more memory devices 204, one or more central processing units (CPUs) 210, I/O interfaces 212, other computer-readable media 214, and network connections 216.

The one or more memory devices 204 may include one or more various types of non-volatile and/or volatile storage technologies. Examples of the one or more memory devices may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices may be utilized to store information, including computer-readable instructions that are utilized by the one or more CPUs 210 to perform actions, including those of embodiments described herein.

The one or more memory devices may have stored thereon an Element Management System (EMS) module 206a, a Service Management and Orchestration (SMO) module 206b, and a Service Orchestrator (SO) module 206c. The Element Management System (EMS) module 206a, a Service Management and Orchestration (SMO) module 206b, and a Service Orchestrator (SO) module 206c are configured to implement and/or perform some or all of the functions of the network management device 202 described herein. The one or more memory devices may also store other programs and data 208, which may include DHCP server functions, connection recovery algorithms, connection recovery rules, network protocols, O-RAN operating rules, user interfaces, operating systems, etc.

Network connections 216 are configured to communicate with other computing devices including the Cellular Site Router (CSR) device 402, and the Radio Unit (RU) devices 502a to 502, and the computing devices 302-1 to 302-11. In various embodiments, the network connections 216 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/ transparent bridge in order to support Radio Unit (RU) copy and combine function for O-RAN cascade mode. I/O interfaces 212 may include a video/display interface, Peripheral Component Interconnect (PCI) interfaces, other data input or output interfaces, or the like. Other computer-readable media 214 may include other types of stationary or removable computer-readable media, such as removable flash drives, external hard drives, or the like.

Figure 3:
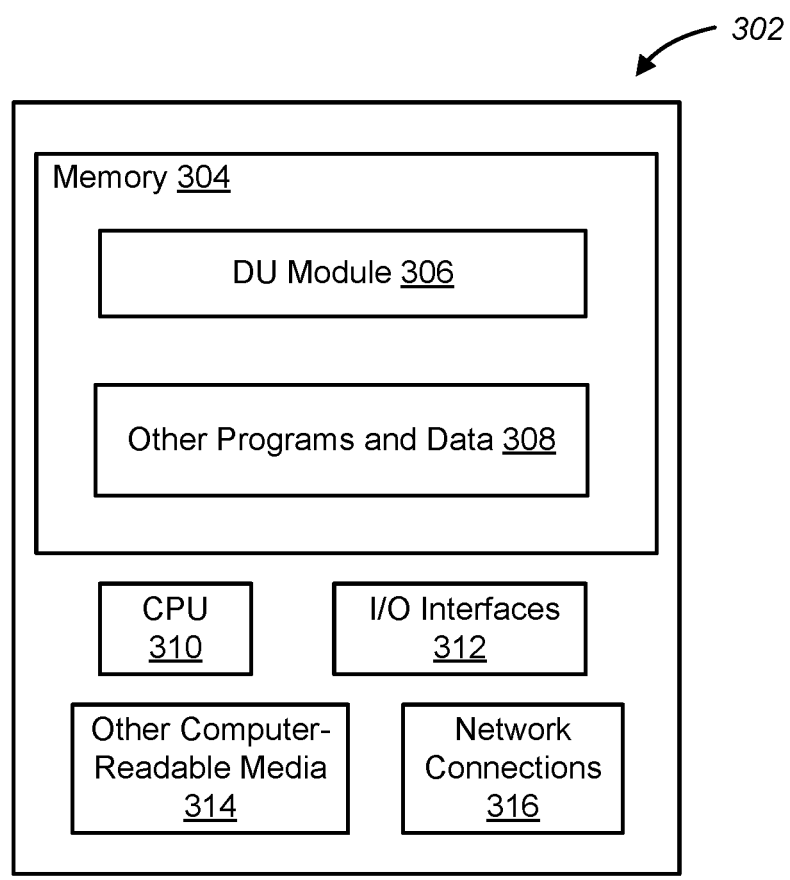
FIG. 3 is a block diagram illustrating a computing device that is configured to operate as a Distributed Unit (DU) device in accordance with embodiments described herein.

FIG. 3 is a block diagram illustrating a computing device that is configured to operate as a Distributed Unit (DU) device in accordance with embodiments described herein. In some embodiments, one or more special-purpose computing systems may be used to implement a Distributed Unit (DU) device 302. Accordingly, various embodiments described herein may be implemented in software, hardware, firmware, or in some combination thereof. The Distributed Unit (DU) device 302 may include one or more memory devices 304, one or more central processing units (CPUs) 310, I/O interfaces 312, other computer-readable media 314, and network connections 316.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon a Distributed Unit (DU) module 306. The Distributed Unit (DU) module 306 is configured to implement and/or perform some or all of the functions of the Distributed Unit (DU) device 302 described herein. The one or more memory devices 304 may also store other programs and data 308, which may include Fault, Configuration, Accounting, Performance, Security (FCAPS) functions, connection recovery algorithms, connection recovery rules, network protocols, O-RAN operating rules, user interfaces, operating systems, etc. For example, the FCAPS functions include Performance Management (PM), Fault Management (FM), Configuration Management, Certificate Manager (certmgr), and security functions.

Network connections 316 are configured to communicate with other computing devices including the network management device 202, the Cellular Site Router (CSR) device 402, and the Radio Unit (RU) devices 502a to 502. In various embodiments, the network connections 316 include transmitters and receivers, a layer 3 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 312 may include PCI interfaces, PCI-Express interfaces, other data input or output interfaces, or the like. Other computer-readable media 314 may include other types of stationary or removable computer-readable media, such as removable flash drives, external hard drives, or the like.

Figure 4:
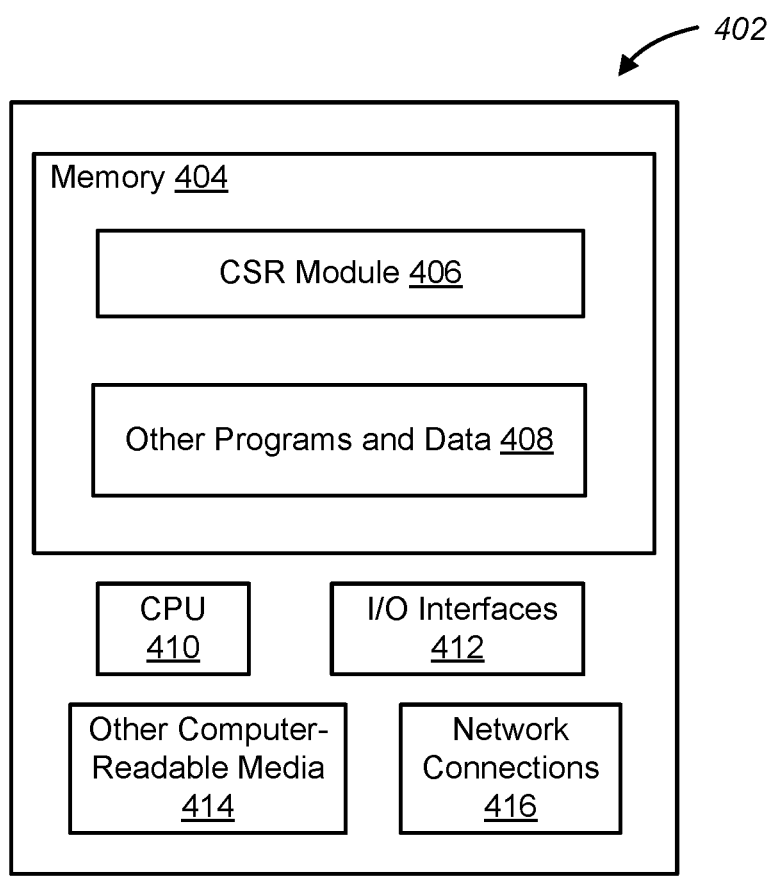
FIG. 4 is a block diagram illustrating an example of a Cellular Site Router (CSR) device in accordance with embodiments described herein.

FIG. 4 is a block diagram illustrating an example of a Cellular Site Router (CSR) in accordance with embodiments described herein. In some embodiments, one or more special-purpose computing systems may be used to implement a Cellular Site Router (CSR) device 402. Accordingly, various embodiments described herein may be implemented in software, hardware, firmware, or in some combination thereof. The Cellular Site Router (CSR) device 402 may include one or more memory devices 404, one or more central processing units (CPUs) 410, I/O interfaces 412, other computer-readable media 414, and network connections 416.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 404 may be utilized to store information, including computer-readable instructions that are utilized by the one or more CPUs 410 to perform actions, including those of embodiments described herein.

The one or more memory devices 404 may have stored thereon a Cellular Site Router (CSR) module 406. The Cellular Site Router (CSR) is configured to implement and/or perform some or all of the functions of the Cellular Site Router (CSR) device 402 described herein. The one or more memory devices 404 may also store other programs and data 408, which may include connection recovery algorithms, connection recovery rules, network protocols, Quality of Service (QoS) functions, operating systems, etc.

Network connections 416 are configured to communicate with other computing devices including the network management device 202, the computing devices 302-1 to 302-11 that can be configured to operate as Distributed Unit (DU) devices, and the Radio Unit (RU) devices 502a to 502. In various embodiments, the network connections 416 include transmitters and receivers, a layer 4 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 412 may include a console port, an auxiliary (AUX) port, other data input or output interfaces, or the like. Other computer-readable media 414 may include other types of stationary or removable computer-readable media, such as removable flash drives, external hard drives, or the like.

Figure 5:
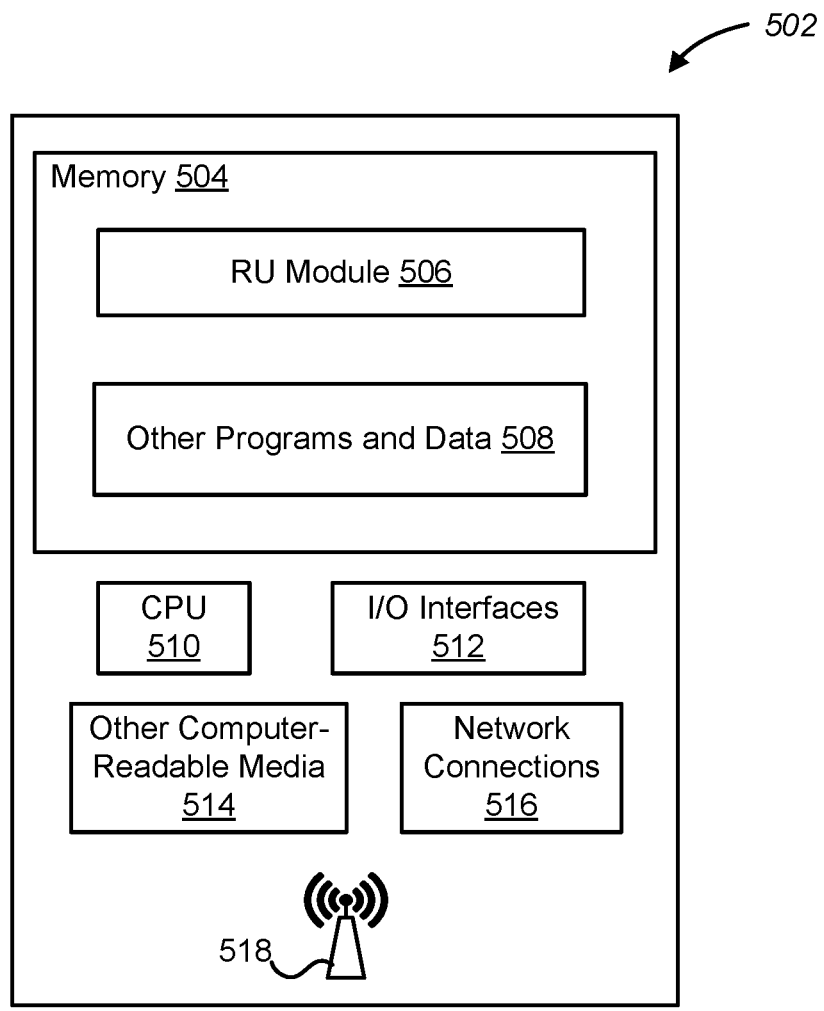
FIG. 5 is a block diagram illustrating an example of a Radio Unit (RU) device in accordance with embodiments described herein.

FIG. 5 is a block diagram illustrating an example of a computing device that is configured to operate as a Radio Unit (RU) device 502 in accordance with embodiments described herein. In some embodiments, one or more special-purpose computing systems may be used to implement the Radio Unit (RU) device 502. Accordingly, various embodiments described herein may be implemented in software, hardware, firmware, or in some combination thereof. The Radio Unit (RU) device 502 may include one or more memory devices 504, one or more central processing units (CPUs) 510, I/O interfaces 512, other computer-readable media 514, and network connections 516.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a Radio Unit (RU) module 506. The Radio Unit (RU) module 506 is configured to implement and/or perform some or all of the functions of the Radio Unit (RU) device 502 described herein and interface with radio transceiver 518. The one or more memory devices 504 may also store other programs and data 508, which may include RU digital certificates, connection recovery algorithms, connection recovery rules, network protocols, O-RAN operating rules, user interfaces, operating systems, etc.

Network connections 516 are configured to communicate with other computing devices including the network management device 202 and a computing device (e.g., computing device 302-1) that is configured to operate as a Distributed Unit (DU). In various embodiments, the network connections 516 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 512 may include enhanced Common Public Radio Interface (eCPRI) ports, Antenna Interface Standards Group (AISG) interfaces, other data input or output interfaces, or the like. Other computer-readable media 514 may include other types of stationary or removable computer-readable media, such as removable flash drives, external hard drives, or the like.

Figure 6:
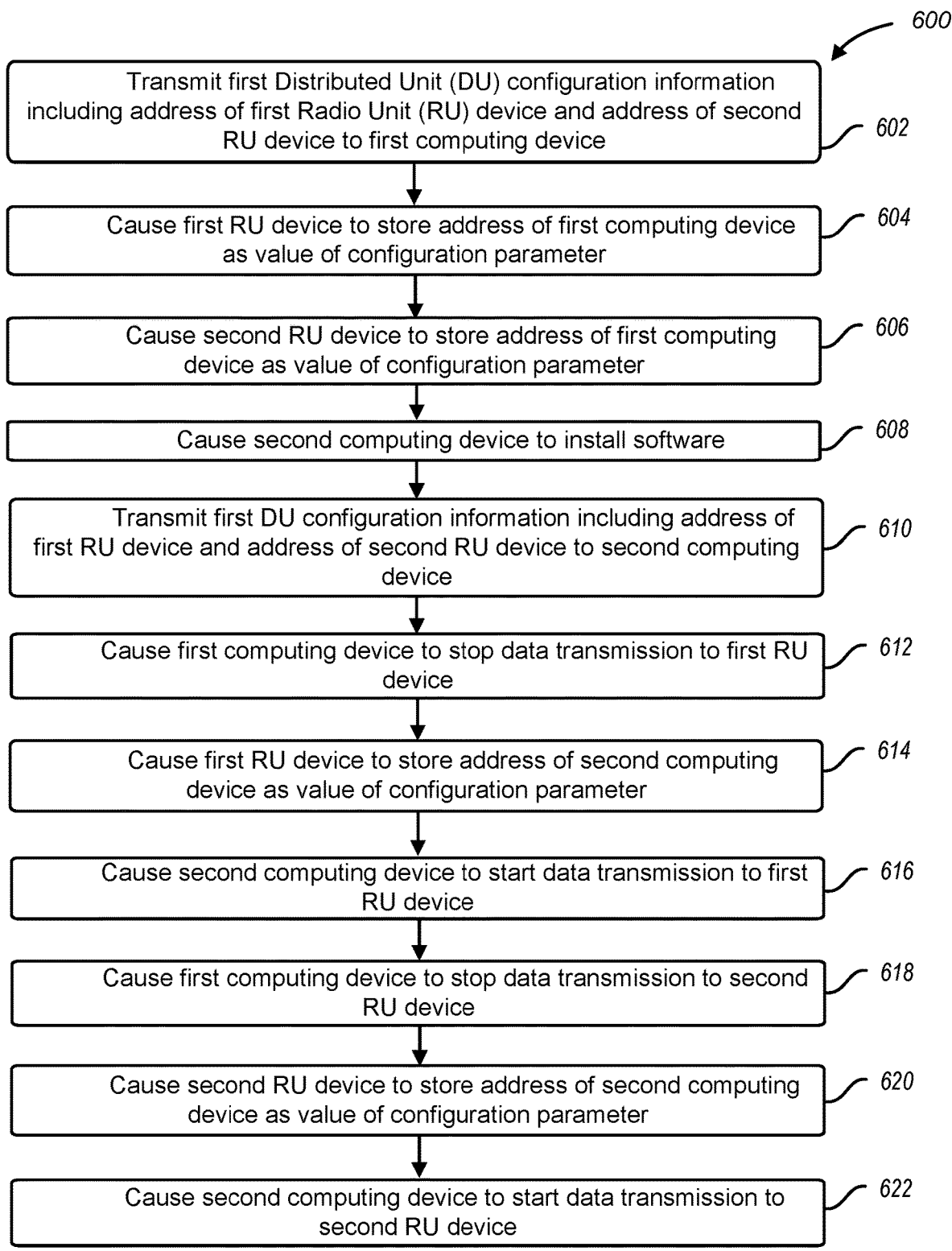
FIG. 6 illustrates a logical flow diagram showing an example of a method for performing a software update in accordance with embodiments described herein.

FIG. 6 illustrates a logical flow diagram showing an example of a method 600 for performing a software update by a network management device in a Radio Access Network (RAN) including a first Radio Unit (RU) device, a second RU device, a first computing device, and a second computing device different from the first computing device in accordance with embodiments described herein. The method 600 begins at 602.

At 602, the network management device transmits first Distributed Unit (DU) configuration information including an address of the first Radio Unit (RU) device and an address of the second RU device to the first computing device. For example, the network management device 202 executes a script (e.g., Python script) that causes the network management device 202 to transmit (e.g., via file transfer protocol (FTP)) first DU configuration information including an address of the RU device 502a and an address of the RU device 502b to the computing device 302-1. The script also may cause the network management device 202 to transmit a configuration script to the computing device 302-1, and cause the RU device 502a to execute the configuration script using the secure shell (SSH) protocol or remote procedure call (RPC) protocol. The method 600 then proceeds to 604.

At 604, the network management device causes the first RU device to store the address of the first computing device as a value of a configuration parameter (e.g., indicating a default route or address to use when forwarding data received via the radio transceiver 518 to the network connections 516). For example, the network management device 202 executes a first script that causes the network management device 202 to establish a NETCONF protocol session with the computing device 302-1, transmit a second script to the computing device 302-1, and then cause the computing device 302-1 to execute the second script, which causes the computing device 302-1 to establish a NETCONF protocol session with the RU device 502a and modify a value of a configuration parameter stored by the RU device 502a to an IP address of the computing device 302-1, for example, using an <edit-config> tag during the NETCONF protocol session. More particularly, the first script may cause the network management device 202 to establish a connection with the computing device 302-1 using the secure shell (SSH) protocol, transmit a Hello message advertising capabilities of the network management device 202 to the computing device 302-1, receive a Hello message advertising capabilities of the computing device 302-1 from the computing device 302-1, transmit the second script to the computing device 302-1, and use the remote procedure call (RPC) protocol to request the computing device 302-1 to execute the second script, which configures the computing device 302-1 to store an IP address of the computing device 302-1 as the value of the configuration parameter. The method 600 then proceeds to 606.

At 606, the network management device causes the second RU device to store the address of the first computing device as a value of a configuration parameter. For example, the network management device 202 executes a first script that causes the network management device 202 to establish a NETCONF protocol session with the computing device 302-1, transmit a second script to the computing device 302-1, and then cause the computing device 302-1 to execute the second script, which causes the computing device 302-1 to establish a NETCONF protocol session with the RU device 502b and modify a value of a configuration parameter stored by the RU device 502a to an IP address of the computing device 302-1, for example, using an <edit-config> tag during the NETCONF protocol session. The method 600 then proceeds to 608.

At 608, the network management device causes the second computing device to install software. For example, the network management device 202 transfers (e.g., via file transfer protocol (FTP)) one or more files including software applications, packages, or modules that are to be upgraded and one or more installation scripts that cause the software applications, packages, or modules to be installed to the computing device 302-11. Also, the network management device 202 issues a command (e.g., via a remote procedure call (RPC)) to the computing device 302-11, which causes the computing device 302-11 to execute the installation scripts and thereby perform the software update. In addition, the network management device 202 causes the computing device 302-11 or a process associated with the software update to restart or reset. For example, the network management device 202 issues a command (e.g., via a remote procedure call (RPC)) to the computing device 302-11, which causes the computing device 302-11 or one or more processes associated with the software update to restart or reset. For example, if the software updated by the software update is a DU server program that is running on the computing device 302-11, the script may issue a command that causes an operating system of the computing device 302-11 to return a list of process identifiers and corresponding process names that are currently being executed, identify a process identifier corresponding to a DU server process, and cause to the DU server process to restart by issuing a command including the process identifier corresponding to the DU server program. The method 600 then proceeds to 610.

At 610, the network management device transmits the first DU configuration information including the address of the first RU device and the address of the second RU device to the second first computing device. For example, the network management device 202 executes a script that causes the network management device 202 to transmit (e.g., via file transfer protocol (FTP)) the first DU configuration information including the address of the RU device 502a and the address of the RU device 502b to the computing device 302-11. The script may also cause the network management device 202 to transmit a configuration script to the computing device 302-11, and cause the RU device 502a to execute the configuration script using the secure shell (SSH) protocol or remote procedure call (RPC) protocol. The method 600 then proceeds to 612.

At 612, the network management device causes the first computing device to stop transmission of data to the first RU device identified by the first configuration information. In one or more implementations, the network management device 202 instructs the computing device 302-1 to stop transfer of C/U-Plane data to the RU 502a device. For example, the network management device 202 uses the E2 interface to instruct the computing device 302-1 to stop transfer of C/U-Plane data to the RU 502a device. The method 600 then proceeds to 614.

At 614, the network management device causes the first RU device to store the address of the second computing device as the value of the configuration parameter. For example, the network management device 202 executes a first script that causes the network management device 202 to establish a NETCONF protocol session with the computing device 302-11, transmit a second script to the computing device 302-11, and then cause the computing device 302-11 to execute the second script, which causes the computing device 302-11 to establish a NETCONF protocol session with the RU device 502*a* and modify a value of a configuration parameter stored by the RU device 502*a* to an IP address of the computing device 302-11, for example, using an <edit-config> tag during the NETCONF protocol session. The method 600 then proceeds to 616.

At 616, the network management device causes the second computing device to start data transmission to the first RU device. In one or more implementations, the network management device 202 instructs the computing device 302-11 to initiate U-Plane configuration to the RU devices 502*a*, and start sending data to and receiving data from the RU devices 502*a*. For example, the computing device 302-11 uses a Fronthaul CUSM-Plane via the fronthaul interface network 150 to initiate the U-Plane configuration to the RU device 502*a*. The method 600 then proceeds to 618.

At 618, the network management device causes the first computing device to stop transmission of data to the second RU device identified by the first configuration information. In one or more implementations, the network management device 202 instructs the computing device 302-1 to stop transfer of C/U-Plane data to the RU 502*b* device. For example, the network management device 202 uses the E2 interface to instruct the computing device 302-1 to stop transfer of C/U-Plane data to the RU 502*b* device. The method 600 then proceeds to 620.

At 620, the network management device causes the second RU device to store the address of the second computing device as the value of the configuration parameter. For example, the network management device 202 executes a first script that causes the network management device 202 to establish a NETCONF protocol session with the computing device 302-11, transmit a second script to the computing device 302-11, and then cause the computing device 302-11 to execute the second script, which causes the computing device 302-11 to establish a NETCONF protocol session with the RU device 502*b* and modify a value of a configuration parameter stored by the RU device 502*b* to the IP address of the computing device 302-11, for example, using an <edit-config> tag during the NETCONF protocol session. The method 600 then proceeds to 622.

At 622, the network management device causes the second computing device to start data transmission to the second RU device. In one or more implementations, the network management device 202 instructs the computing device 302-11 to initiate U-Plane configuration to the RU devices 502*b*, and start sending data to and receiving data from the RU devices 502*b*. For example, the computing device 302-11 uses a Fronthaul CUSM-Plane via the fronthaul interface network 150 to initiate the U-Plane configuration to the RU device 502*b*. The method 600 then ends.

Figure 7:
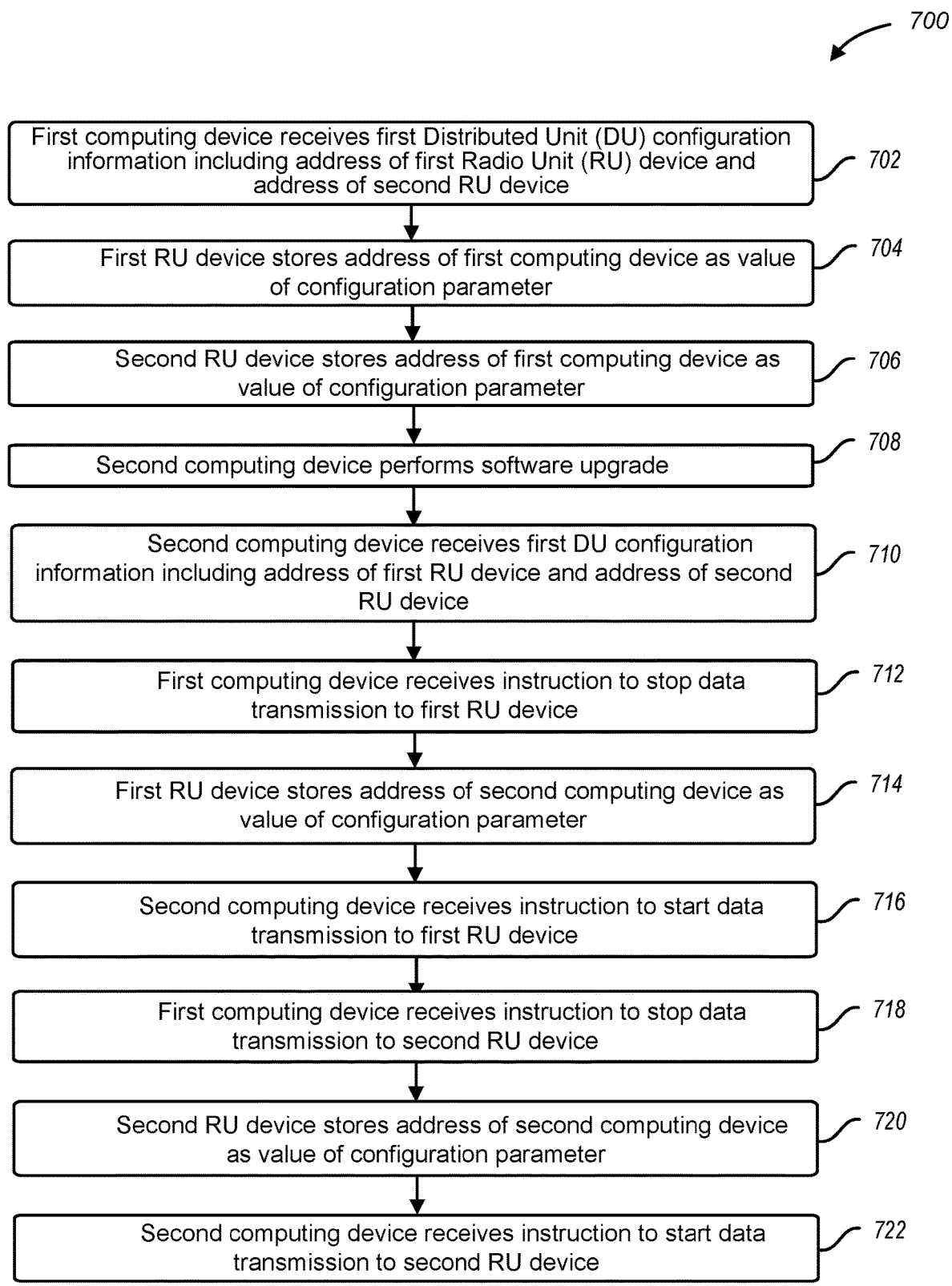
FIG. 7 illustrates a logical flow diagram showing an example of a method for performing a software update in accordance with embodiments described herein.

FIG. 7 illustrates a logical flow diagram showing an example of a method 700 for performing a software update by a network management device in a Radio Access Network (RAN) including a first Radio Unit (RU) device a second RU device, a first computing device, and a second computing device different from the first computing device in accordance with embodiments described herein. The method 700 begins at 702.

At 702, the first computing device receives first Distributed Unit (DU) configuration information including an address of the first RU device and an address of the second RU device. For example, the computing device 302-1 receives first DU configuration information including addresses of the RU device 502*a* and RU device 502*b* from the network management device 202, which transmits the first DU configuration information at 602 of the method 600 shown in FIG. 6. The method 700 then proceeds to 704.

At 704, the first RU device stores an address of the first computing device as a value of a configuration parameter. For example, the RU device 502*a* is caused to store the address of the computing device 302-1 as the value of the configuration parameter at 604 of the method 600 shown in FIG. 6. The method 700 then proceeds to 706.

At 706, the second RU device stores the address of the first computing device as the value of the configuration parameter. For example, the RU device 502*b* is caused to store the address of the computing device 302-1 as the value of the configuration parameter at 606 of the method 600 shown in FIG. 6. The method 700 then proceeds to 706.

At 708, the second computing device performs a software upgrade. For example, the computing device 302-11 is caused to install the software at 608 of the method 600 shown in FIG. 6. The method 700 then proceeds to 10

At 708, the second computing device performs a software upgrade. For example, the computing device 302-11 is caused to install the software at 608 of the method 600 shown in FIG. 6. The method 700 then proceeds to 710.

At 710, the second computing device receives the first DU configuration information including the address of the first RU device and the address of the second RU device. For example, the computing device 302-11 receives the first DU configuration information including addresses of the RU device 502*a* and RU device 502*b* from the network management device 202, which transmits the first DU configuration information at 610 of the method 600 shown in FIG. 6. The method 700 then proceeds to 712.

At 712, the first computing device receives an instruction to stop data transmission to the first RU device. For example, the computing device 302-1 receives an instruction to stop data transmission to the RU device 502*a* from the network management device 202, which transmits the instruction to the computing device 302-1 at 612 of the method 600 shown in FIG. 6. The method 700 then proceeds to 714.

At 714, the first RU device stores an address of the second computing device as the value of the configuration parameter. For example, the RU device 502*a* is caused to store the address of the computing device 302-11 as the value of the configuration parameter at 614 of the method 600 shown in FIG. 6. The method 700 then proceeds to 716.

At 716, the second computing device receives an instruction to start data transmission to the first RU device. For example, the computing device 302-11 receives an instruction to start data transmission to the RU device 502*a* from the network management device 202, which transmits the instruction to the computing device 302-1 at 616 of the method 600 shown in FIG. 6. The method 700 then proceeds to 714.

At 718, the first computing device receives an instruction to stop data transmission to the second RU device. For example, the computing device 302-1 receives an instruction to stop data transmission to the RU device 502*b* from the network management device 202, which transmits the instruction to the computing device 302-1 at 618 of the method 600 shown in FIG. 6. The method 700 then proceeds to 720.

At 720, the second RU device stores the address of the second computing device as the value of the configuration parameter. For example, the RU device 502*b* is caused to store the address of the computing device 302-11 as the value of the configuration parameter at 620 of the method 600 shown in FIG. 6. The method 700 then proceeds to 722.

At 722, the second computing device receives an instruction to start data transmission to the second RU device. For example, the computing device 302-11 receives an instruction to start data transmission to the RU device 502b from the network management device 202, which transmits the instruction to the computing device 302-1 at 622 of the method 600 shown in FIG. 6. The method 700 then ends.

FIGS. 8A to 8K are diagrams for explaining an example of performing a software upgrade on a plurality of computing devices that can be configured to operate as Distributed Units in accordance with embodiments described herein.

FIG. 8A illustrates initial roles of each of the computing devices 302-1 to 302-11, before the method 600 shown in FIG. 6 and the method 700 shown in FIG. 7 are performed. Although the network system 100 includes only one computing devices (e.g., 302-11) that is currently playing a role of a mirror device, as indicated by the designation MIRROR, one skilled in the art will appreciate that multiple computing devices could be used as mirror devices to simultaneously perform multiple software updates in parallel.

More particularly, in FIG. 8A, the computing device 302-1 is an operational device configured with first DU configuration information DU #1, the computing device 302-2 is an operational device that is configured with second DU configuration information DU #2, the computing device 302-3 is an operational device that is configured with third DU configuration information DU #3, the computing device 302-4 is an operational device that is configured with fourth DU configuration information DU #4, the computing device 302-5 is an operational device that is configured with fifth DU configuration information DU #5, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is a mirror device designated as MIRROR.

FIG. 8B illustrates roles of each of the computing devices 302-1 to 302-11, after the method 600 shown in FIG. 6 and the method 700 shown in FIG. 7 are performed a first time. More particularly, in FIG. 8B, the computing device 302-1 is a mirror device designated as MIRROR, the computing device 302-2 is an operational device that is configured with second DU configuration information DU #2, the computing device 302-3 is an operational device that is configured with third DU configuration information DU #3, the computing device 302-4 is an operational device that is configured with fourth DU configuration information DU #4, the computing device 302-5 is an operational device that is configured with fifth DU configuration information DU #5, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8C illustrates roles of each of the computing devices 302-1 to 302-11, after the method 600 shown in FIG. 6 and the method 700 shown in FIG. 7 are performed a second time. More particularly, in FIG. 8C, the computing device 302-1 is an operational device configured with second DU configuration information DU #2 and that has performed a software upgrade, the computing device 302-2 is a mirror device designated as MIRROR, the computing device 302-3 is an operational device that is configured with third DU configuration information DU #3, the computing device 302-4 is an operational device that is configured with fourth DU configuration information DU #4, the computing device 302-5 is an operational device that is configured with fifth DU configuration information DU #5, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8D illustrates roles of each of the computing devices 302-1 to 302-11, after the method 600 shown in FIG. 6 and the method 700 shown in FIG. 7 are performed a third time. More particularly, in FIG. 8D, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is a mirror device designated as MIRROR, the computing device 302-4 is an operational device that is configured with fourth DU configuration information DU #4, the computing device 302-5 is an operational device that is configured with fifth DU configuration information DU #5, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8E illustrates roles of each of the computing devices 302-1 to 302-11, after the method 600 shown in FIG. 6 and the method 700 shown in FIG. 7 are performed a fourth time. More particularly, in FIG. 8E, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is a mirror device designated as MIRROR, the computing device 302-5 is an operational device that is configured with fifth DU configuration information DU #5, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8F illustrates roles of each of the computing devices 302-1 to 302-11, after the method 600 shown in FIG. 6 and the method 700 shown in FIG. 7 are performed a fifth time. More particularly, in FIG. 8F, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is an operational device that is configured with fifth DU configuration information DU #5 and that has performed a software upgrade, the computing device 302-5 is a mirror device designated as MIRROR, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8G illustrates roles of each of the computing devices 302-1 to 302-11, after the method 600 shown in FIG. 6 and the method 700 shown in FIG. 7 are performed a sixth time. More particularly, in FIG. 8G, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is an operational device that is configured with fifth DU configuration information DU #5 and that has performed a software upgrade, the computing device 302-5 is an operational device that is configured with sixth DU configuration information DU #6 and that has performed a software upgrade, the computing device 302-6 is a mirror device designated as MIRROR, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8H illustrates roles of each of the computing devices 302-1 to 302-11, after the method 600 shown in FIG. 6 and the method 700 shown in FIG. 7 are performed a seventh time. More particularly, in FIG. 8H, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is an operational device that is configured with fifth DU configuration information DU #5 and that has performed a software upgrade, the computing device 302-5 is an operational device that is configured with sixth DU configuration information DU #6 and that has performed a software upgrade, the computing device 302-6 is an operational device that is configured with seventh DU configuration information DU #7 and that has performed a software upgrade, the computing device 302-7 is a mirror device designated as MIRROR, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8I illustrates roles of each of the computing devices 302-1 to 302-11, after the method 600 shown in FIG. 6 and the method 700 shown in FIG. 7 are performed an eighth time. More particularly, in FIG. 8I, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is an operational device that is configured with fifth DU configuration information DU #5 and that has performed a software upgrade, the computing device 302-5 is an operational device that is configured with sixth DU configuration information DU #6 and that has performed a software upgrade, the computing device 302-6 is an operational device that is configured with seventh DU configuration information DU #7 and that has performed a software upgrade, the computing device 302-7 is an operational device that is configured with eighth DU configuration information DU #8 and that has performed a software upgrade, the computing device 302-8 is a mirror device designated as MIRROR, the computing device 302-9 is an operational device that is configured with ninth DU configuration information DU #9, the computing device 302-10 is an operational device that is configured with tenth DU configuration information DU #10, the computing device 302-11 is an operational device configured with first DU configuration information DU #1 and that has performed a software upgrade.

FIG. 8J illustrates roles of each of the computing devices 302-1 to 302-11, after the method 600 shown in FIG. 6 and the method 700 shown in FIG. 7 are performed a ninth time. More particularly, in FIG. 8J, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is an operational device that is configured with fifth DU configuration information DU #5 and that has performed a software upgrade, the computing device 302-5 is an operational device that is configured with sixth DU configuration information DU #6 and that has performed a software upgrade, the computing device 302-6 is an operational device that is configured with seventh DU configuration information DU #7 and that has performed a software upgrade, the computing device 302-7 is an operational device that is configured with eighth DU configuration information DU #8 and that has performed a software upgrade, the computing device 302-8 is an operational device that is configured with ninth DU configuration information DU #9 and that has performed a software upgrade, the computing device 302-9 is a mirror device designated as MIRROR, is the computing device 302-10 is an operational device that is configured with tenth DU configuration information DU #10, the computing device 302-11 is an operational device configured with first DU configuration information DU #1 and that has performed a software upgrade.

FIG. 8K illustrates roles of each of the computing devices 302-1 to 302-11, after the method 600 shown in FIG. 6 and the method 700 shown in FIG. 7 are performed a tenth time. More particularly, in FIG. 8K, the computing device 302-1 is an operational device configured with second DU configuration information DU #2 and that has performed a software upgrade, the computing device 302-2 is an operational device that is configured with third DU configuration information DU #3 and that has performed a software upgrade, the computing device 302-3 is an operational device that is configured with fourth DU configuration information DU #4 and that has performed a software upgrade, the computing device 302-4 is an operational device that is configured with fifth DU configuration information DU #5 and that has performed a software upgrade, the computing device 302-5 is an operational device that is configured with sixth DU configuration information DU #6 and that has performed a software upgrade, the computing device 302-6 is an operational device that is configured with seventh DU configuration information DU #7 and that has performed a software upgrade, the computing device 302-7 is an operational device that is configured with eighth DU configuration information DU #8 and that has performed a software upgrade, the computing device 302-8 is an operational device that is configured with ninth DU configuration information DU #9 and that has performed a software upgrade, the computing device 302-9 is an operational device that is configured with tenth DU configuration information DU #10 and that has performed a software upgrade, the computing device 302-10 is a mirror device designated as MIRROR, computing device 302-11 is an operational device configured with first DU configuration information DU #1 and that has performed a software upgrade.

As shown in FIG. 8A, ten computing devices (i.e., computing device 302-1 to 302-10) that have not performed software upgrades are configured with DU configuration information DU #1 to DU #10, respectively. As shown in FIG. 8K, ten computing devices (i.e., computing device 302-1 to 302-9 and 302-11) that have performed software upgrades are configured with DU configuration information DU #1 to DU #10, respectively.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed in a Radio Access Network (RAN) including a first Radio Unit (RU) device, a first computing device, and a second computing device different from the first computing device, the method comprising:
    installing, by the second computing device, software on the second computing device;
    receiving, by the second computing device, first Distributed unit (DU) configuration information that includes an address of the first RU device;
    receiving, by the first computing device, an instruction to stop data transmission to the first RU device;
    storing, by the first RU device, an address of the second computing device as a value of a configuration parameter; and
    receiving, by the second computing device, an instruction to start data transmission to the first RU device.

2. The method according to claim 1, wherein:
    the receiving, by the first computing device, the instruction to stop data transmission to the first RU device is before the storing, by the first RU device, the address of the second computing device as the value of the configuration parameter.

3. The method according to claim 1, further comprising:
    establishing, by the second computing device, a Network Configuration (NETCONF) protocol session with the first RU device; and
    requesting, by the second computing device, the first RU device to store the address of the second computing device as the value of the configuration parameter during the NETCONF protocol session with the first RU device.

4. The method according to claim 1, wherein:
    the RAN includes a second RU device different from the first RU device, the first DU configuration information includes an address of the second RU device, and the method further comprises:

storing, by the second RU device, the address of the first computing device as the value of the configuration parameter;

receiving, by the first computing device, an instruction to stop data transmission to the second RU device;

storing, by the second RU device, the address of the second computing device as the value of the configuration parameter; and receiving, by the second computing device, an instruction to start data transmission to the second RU device.

5. The method according to claim 1, further comprising:
installing, by the first computing device, the software on the first computing device.

6. The method according to claim 1, wherein:
the RAN includes a second RU device different from the first RU device and a third computing device different from the first computing device and the second computing device, and the method further comprises:

installing, by the first computing device, the software on the first computing device;

receiving, by the third computing device, second DU configuration information that includes an address of the second RU device;

storing, by the second RU device, an address of the third computing device as the value of the configuration parameter;

receiving, by the first computing device, the second DU configuration information that includes the address of the second RU device;

receiving, by the third computing device, an instruction to stop data transmission to the second RU device;

storing, by the second RU device, the address of the first computing device as the value of the configuration parameter; and receiving, by the first computing device, an instruction to start data transmission to the second RU device.

7. A method of performing a software update by a network management system for a Radio Access Network (RAN) including a first Radio Unit (RU) device, a first computing device, and a second computing device different from the first computing device, the method comprising:

causing the second computing device to install software;

transmitting first DU configuration information including an address of first RU device to the second computing device;

causing the first computing device to stop data transmission to the first RU device;

causing the first RU device to store an address of the second computing device as a value of a configuration parameter; and causing the second computing device to start data transmission to the first RU device.

8. The method according to claim 7, further comprising:
causing the first computing device to install the software.

9. The method according to claim 7, wherein:
the RAN includes a second RU device different from the first RU device, the RAN includes a third computing device different from the first computing device and the second computing device, and the method further comprises:

transmitting second DU configuration information including an address of the second RU device to the third computing device;

causing the second RU device to store an address of the third computing device as the value of the configuration parameter;

causing the first computing device to install the software;

transmitting the second DU configuration information including the address of second RU device to the first computing device;

causing the third computing device to stop data transmission to the second RU device;

causing the second RU device to store the address of the first computing device as the value of the configuration parameter; and causing the first computing device to start data transmission to the second RU device.

10. The method according to claim 7, wherein:
the RAN includes a second RU device different from the first RU device, the first DU configuration information includes an address of the second RU device, and the method further comprises:

causing the second RU device to store address of the first computing device as the value of the configuration parameter;

causing the first computing device to stop data transmission to the second RU device;

causing the first RU device to store the address of the second computing device as the value of the configuration parameter; and causing the second computing device to start data transmission to the second RU device.

11. The method according to claim 7, wherein:
the causing the first computing device to stop data transmission to the first RU device is before the causing the first RU device to store the address of the second computing device as the value of the configuration parameter.

12. The method according to claim 7, wherein:
the causing the first RU device to store the address of the first computing device as the value of the configuration parameter includes causing the first computing device to establish a Network Configuration (NETCONF) protocol session with the first RU device, and the causing the first RU device to store the address of the second computing device as the value of the configuration parameter includes causing the second computing device to establish a NETCONF protocol session with the first RU device.

13. The method according to claim 7, wherein the causing the second computing device to install software includes:
causing the second computing device to store the software;

causing the second computing device to perform an installation process that installs the software on the second computing device; and causing the second computing device or at least one process running on the second computing device to restart after the software is installed on the second computing device.

14. A network management system for a Radio Access Network (RAN) including a first Radio Unit (RU) device, a first computing device, and a second computing device different from the first computing device, the system comprising:

one or more processors; and
one or more storage devices storing instructions that, when executed by the one or more processors, cause the one or more processors to:
cause the second computing device to install software;
transmit first DU configuration information including an address of first RU device to the second computing device;
cause the first computing device to stop data transmission to the first RU device;
cause the first RU device to store an address of the second computing device as a value of a configuration parameter; and
cause the second computing device to start data transmission to the first RU device.

15. The system according to claim 14, wherein the instructions stored by the one or more storage devices, when executed by the one or more processors, cause the one or more processors to cause the first computing device to install the software.

16. The system according to claim 14, wherein:
the RAN includes a second RU device different from the first RU device,
the RAN includes a third computing device different from the first computing device and the second computing device, and
the instructions stored by the one or more storage devices, when executed by the one or more processors, cause the one or more processors to:
transmit second DU configuration information including an address of the second RU device to the third computing device;
cause the second RU device to store an address of the third computing device as the value of the configuration parameter;
cause the first computing device to install the software;
transmit the second DU configuration information including the address of second RU device to the first computing device;
cause the third computing device to stop data transmission to the second RU device;
cause the second RU device to store the address of the first computing device as the value of the configuration parameter; and
cause the first computing device to start data transmission to the second RU device.

17. The system according to claim 14, wherein:
the RAN includes a second RU device different from the first RU device,
the first DU configuration information includes an address of the second RU device, and
the instructions stored by the one or more storage devices, when executed by the one or more processors, cause the one or more processors to:
cause the second RU device to store address of the first computing device as the value of the configuration parameter;
cause the first computing device to stop data transmission to the second RU device;
cause the first RU device to store the address of the second computing device as the value of the configuration parameter; and
cause the second computing device to start data transmission to the second RU device.

18. The system according to claim 14, wherein the instructions stored by the one or more storage devices, when executed by the one or more processors, cause the one or more processors to cause the first computing device to stop data transmission to the first RU device is before causing the first RU device to store the address of the second computing device as the value of the configuration parameter.

19. The system according to claim 14, wherein the instructions stored by the one or more storage devices, when executed by the one or more processors, cause the one or more processors to:
cause the first computing device to establish a Network Configuration (NETCONF) protocol session with the first RU device to cause the first RU device to store the address of the first computing device as the value of the configuration parameter includes, and
cause the second computing device to establish a NETCONF protocol session with the first RU device to cause the first RU device to store the address of the second computing device as the value of the configuration parameter includes.

20. The system according to claim 14, wherein the instructions stored by the one or more storage devices, when executed by the one or more processors, cause the one or more processors to;
cause the second computing device to store the software;
cause the second computing device to perform an installation process that installs the software on the second computing device; and
cause the second computing device or at least one process running on the second computing device to restart after the software is installed on the second computing device.

* * * * *